Figure 1:
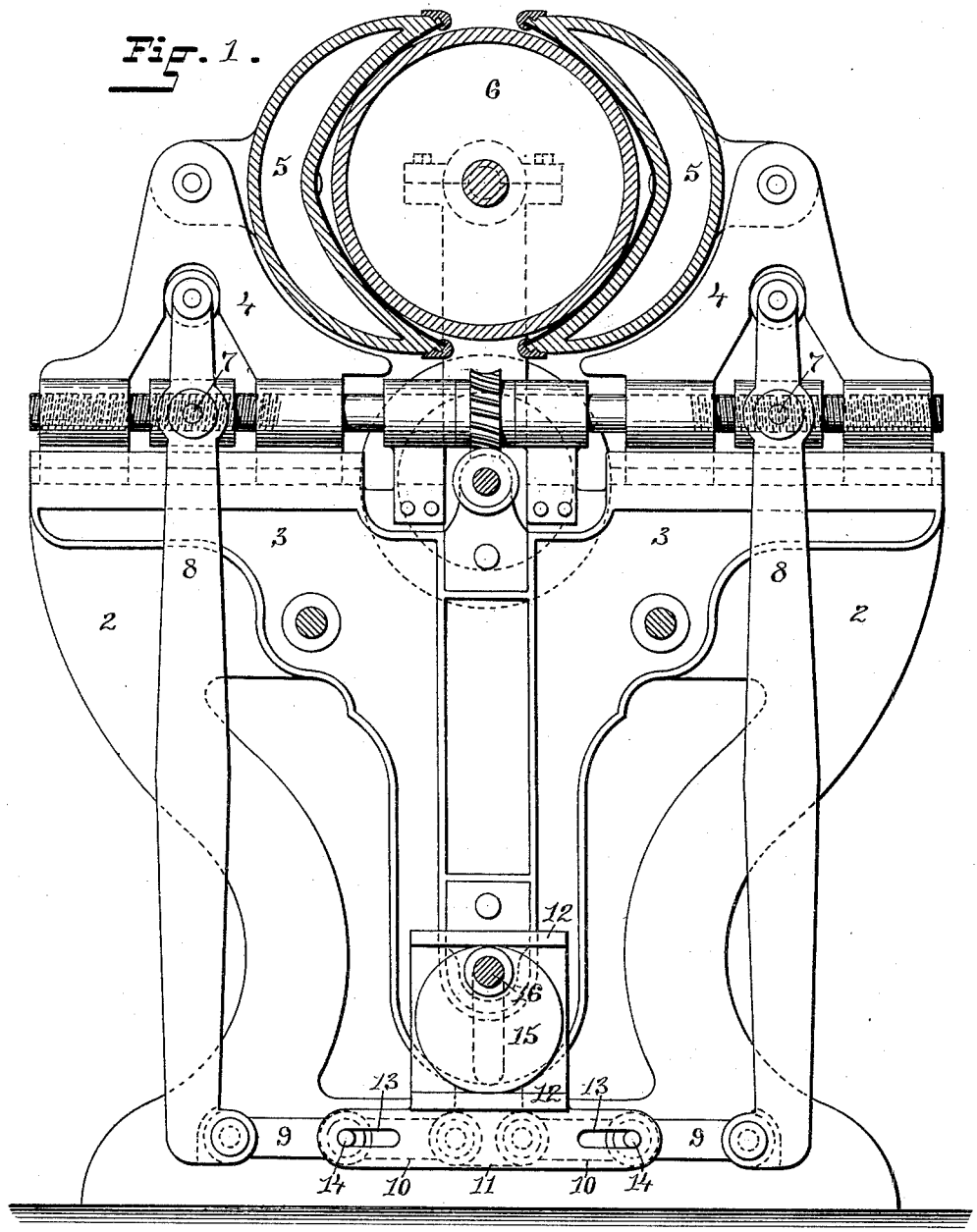

(No Model.) 3 Sheets—Sheet 1.

G. W. VOELKER.
CLOTH PRESSING MACHINE.

No. 453,028. Patented May 26, 1891.

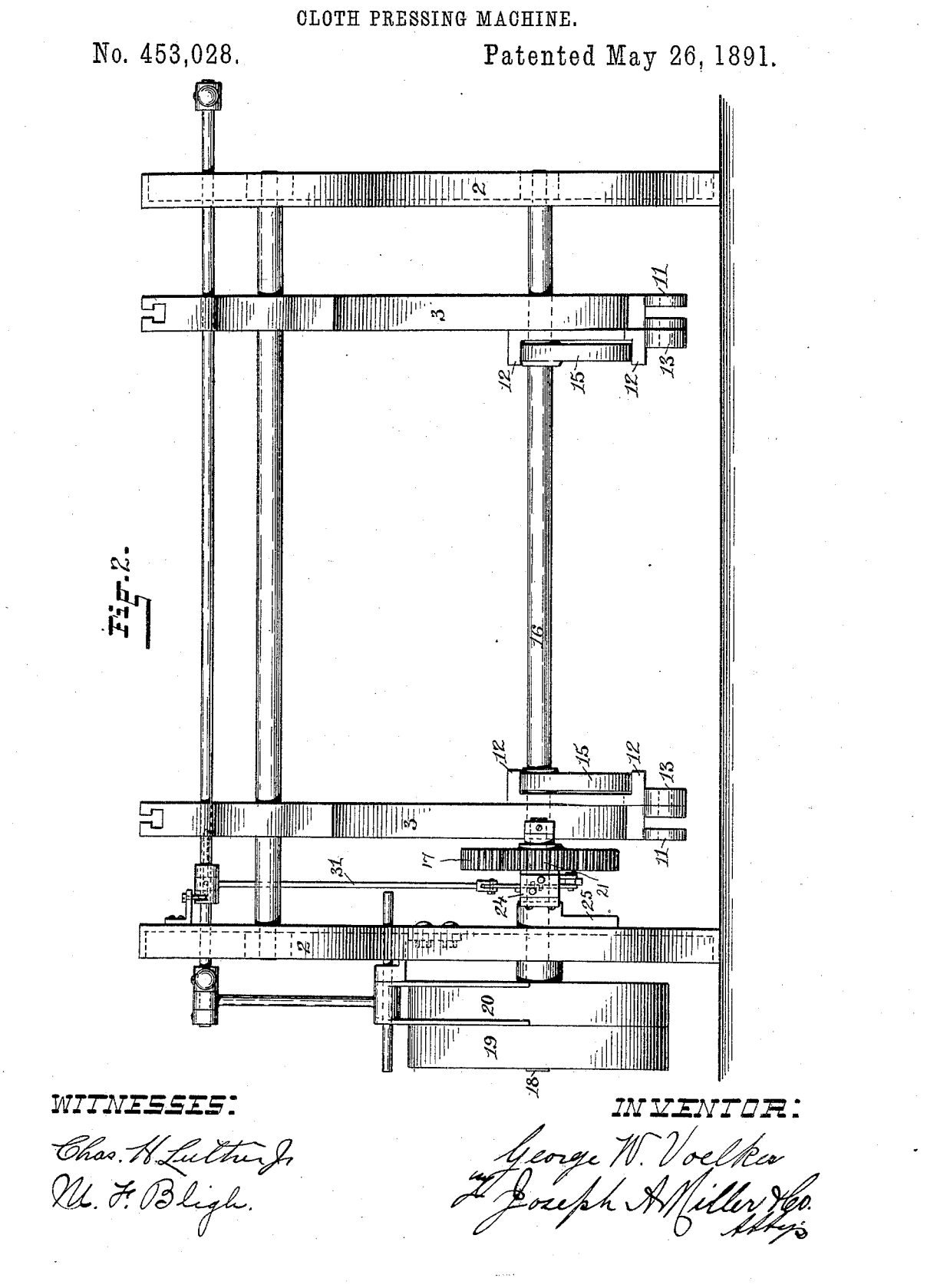

(No Model.)  3 Sheets—Sheet 2.

G. W. VOELKER.
CLOTH PRESSING MACHINE.

No. 453,028. Patented May 26, 1891.

Fig. 2.

WITNESSES:
Chas. H. Luther Jr.
M. F. Bligh.

INVENTOR:
George W. Voelker
by Joseph A. Miller & Co.
Attys (No Model.) 3 Sheets—Sheet 3.
G. W. VOELKER.
CLOTH PRESSING MACHINE.
No. 453,028. Patented May 26, 1891.
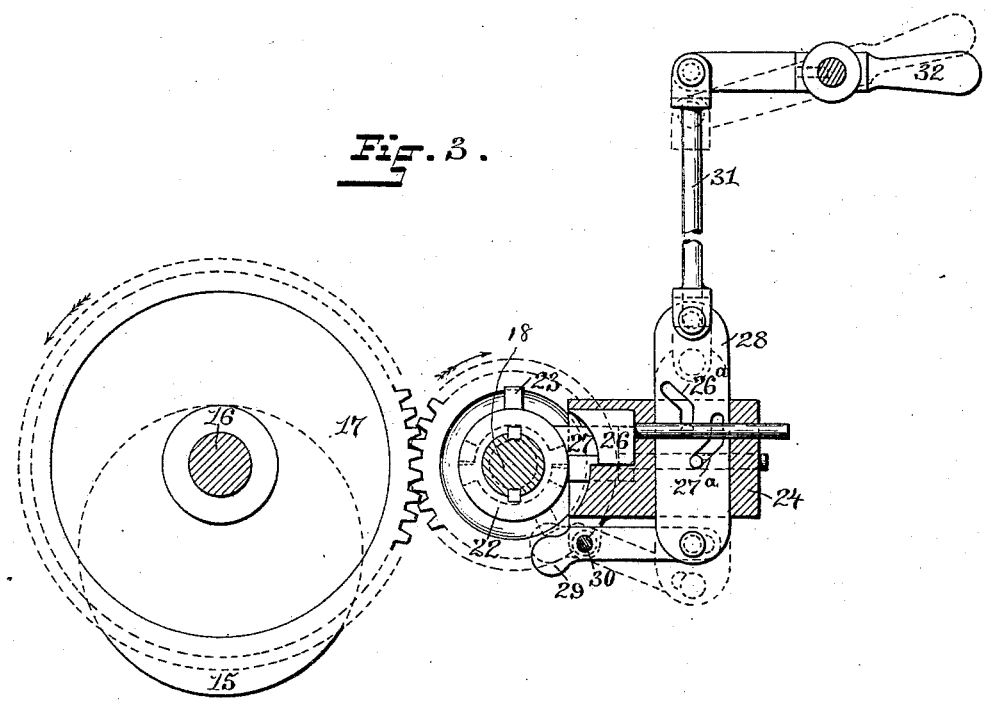
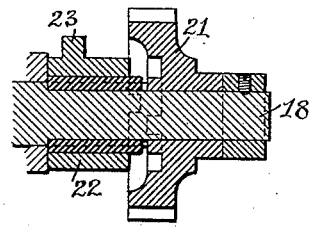
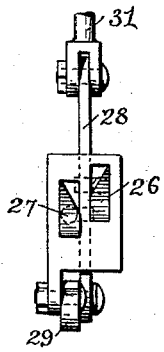
WITNESSES: INVENTOR:

UNITED STATES PATENT OFFICE.

GEORGE W. VOELKER, OF WOONSOCKET, RHODE ISLAND.

CLOTH-PRESSING MACHINE.

SPECIFICATION forming part of Letters Patent No. 453,028, dated May 26, 1891.

Application filed January 12, 1891. Serial No. 377,478. (No model.)

*To all whom it may concern:*

Be it known that I, GEORGE W. VOELKER, of Woonsocket, in the county of Providence and State of Rhode Island, have invented a new and useful Improvement in Cloth-Pressing Machines; and I hereby declare that the following is a full, clear, and exact description of the same, reference being had to the accompanying drawings, forming part of this specification.

This invention has reference to an improvement in the mechanism for operating the presser block or blocks of cloth-pressing machines; and it consists in the peculiar and novel construction of the mechanism, as will be more fully set forth hereinafter.

In cloth-pressing machines in which the cloth is pressed between a cylinder and a presser-block or presser-blocks the presser block or blocks are arranged so that they can be moved away from the cylinder to permit the cloth to be entered and when the cloth is entered be forced toward the cylinder to press the cloth between the block or blocks and the cylinder. The presser-blocks are usually operated by means of levers and the levers by a cam or crank, which when placed in one position holds the presser block or blocks in contact with the cloth on the cylinder and in the opposite position holds the presser block or blocks away from the cylinder, thus permitting the cloth to be entered. The cam or the crank by which the presser block or blocks are operated through the levers has capacity to turn continuously in one direction, but requires to be stopped at the two opposite points of the extreme stroke, or what is termed the "dead-centers."

The object of this invention is to so construct mechanism for operating the cam or its equivalent (a crank) that the driving mechanism may be connected to rotate the cam-shaft and will be automatically disconnected when the cam has reached the extreme of its throw, or the dead-center, at one of the two opposite points and the presser block or blocks will be held in the closed or open position.

In the accompanying drawings, Figure 1 is a transverse sectional view of a cloth-pressing machine, showing two presser-blocks held against the cylinder by a cam. Fig. 2 is a skeleton view of one side of a cloth-pressing machine, showing the cam-shaft and the mechanism for operating the same. Fig. 3 is a view, partly in section, of the clutch mechanism by which the driving-shaft is connected with the cam-shaft and automatically disconnected therefrom. Fig. 4 is a section through the center of the driving-shaft, the gear, and the clutch. Fig. 5 is an end view of the cam-block and slide.

Similar numbers of reference indicate corresponding parts in all the figures.

Referring for the general description of one form of cloth-pressing machines to Fig. 1, the numbers 2 indicate the end frame of the machine, and 3 the bed-frame, on which the carriages 4 are supported and on which they are made to slide toward and from the center of the machine.

5 are the presser-blocks, supported on the carriages 4.

6 is the cylinder.

7 are adjustable fulcrums on which the levers 8 are pivoted. The upper ends of the levers 8 engage with the carriages 4, and to the lower ends are pivoted the levers 9, whose opposite ends are pivotally connected to the levers 10, pivoted in the end 11 of the bed-frame 3, the levers 9 10, forming toggle-jointed levers connecting the lower ends of the levers 8 with the lower end of the frame 3. The slide 12 is provided with the slots 13 in which the pin 14, forming the pivot of the toggle-jointed levers 9 10, has the capacity to slide when by the turning of the cam 15, secured to the shaft 16, the slide 12 is raised.

The mechanism between the shaft 16 and the levers 8 may be arranged and constructed in any desired manner without materially changing the nature of my invention, which is applicable to all mechanical means for operating the levers by one-half turn of the shaft 16, so as to open or close the presser-blocks, and to this end I provide the shaft 16 with the gear 17, and the driving-shaft 18, having the loose pulley 19, and the driving-pulley 20 with the loose clutch-gear 21, and the clutch 22, having capacity of longitudinal movement on the shaft 18 and connected with the same by a longitudinal spline. The clutch 22 and the clutch-gear 21 are provided with interlocking ends, so that when the clutch 22 is moved into contact with the loose clutch-gear 21 the said gear will revolve with the driving-shaft 18, and transmit motion to the shaft 16 by means of the gear 17. The clutch 22 is provided with the projecting pin 23. The clutch-block 24 is secured to the bracket 25, which bracket is bolted to the end frame 2.

In the clutch-block 24 the beveled cams 26 and 27 are supported in ways, and are connected with the slots $26^a$ and $27^a$ by means of rods, to which pins are secured, which pins enter the slots $26^a$ and $27^a$ in the vertical slide 28. When the vertical slide 28 is in the raised position, as is shown in solid lines in Fig. 3, the cam 27 projects from the clutch-block 24, and the pin 23 in turning with the clutch 22 encounters the beveled surface of the cam 27, and is forced with the clutch 22 away from the loose gear 21, disconnecting the clutch from the loose gear and permitting the gear to turn loose on the driving-shaft 18. When now the vertical slide is depressed, as is indicated in broken lines in Fig. 3, the cam 27 is drawn into the clutch-block 24, and the cam 26 projected from the same, and when in rotation with the shaft 18 the pin 23 comes in contact with the beveled surface of the cam 26 the pin 23 and the clutch 22 slide on the shaft 18 and the clutch engages with the loose gear 21, so that the same rotates with the shaft 18 and transmits power to the shaft 16 by means of the gears 17 and 21. The arm 29 is pivotally supported on the pin 30, secured in a bracket below the clutch-block 24, and is also pivotally connected with the lower end of the vertical slide 28, the projecting end of the arm 29 being of sufficient width to be always in the path of the pin 23 when raised. The vertical slide 28 is connected by the rod 31 with the pivoted hand-lever 32.

The device is shown in the drawings in the position occupied by the various parts when the presser-blocks are held against the cylinder or the cloth on the cylinder and the driving-shaft 18 is disconnected from the shaft 16. When, now, the presser-blocks are to be moved away from the cylinder, the handle of the hand-lever 32 is raised, the vertical slide 28 is depressed and the projecting end of the arm 29 is raised, as is indicated in broken lines in Fig. 3. In this position the cam 26 is moved outward by the cam-slot $26^a$ and the cam 27 is drawn inward by the cam-slot $27^a$, the pin 23 encounters the beveled surface of the cam 26 and is moved with the clutch 22 toward the loose clutch-gear 21. The clutch 22 engages with the loose clutch-gear 21, and this gear, turning with the driving-shaft 18, transmits motion to the gear 17 and shaft 16. The pin after passing by the cam 26 comes in contact with the projecting end of the arm 29 and depresses the same, thereby raising the vertical slide 28, which, by means of the cam-slots $26^a$ and $27^a$, draws in the cam 26 and pushes out the cam 27. The pin 23 continues its rotation with the clutch 22 and the loose clutch-gear 21 until the pin 23 encounters the beveled face of the cam 27, when the clutch is drawn away from the loose clutch-gear 21, and the rotation of the loose clutch-gear 21 the gear 17, and shaft 16 and with the same the rotation of the cam 15 or its equivalent ceases. The cam 26 is placed sufficiently higher than the cam 27 to insure one complete revolution of the loose clutch-gear 21, and as this gear is one-half the diameter of the gear 17 one-half of a revolution of the shaft 16 takes place after each operation of the clutch device. A cam or crank secured to the shaft 16 will make one-half of a revolution, and this motion of a cam or lever may be transmitted to the presser block or blocks either by means of levers in the manner herein shown and described or in any other suitable manner.

Having thus described my invention, I claim as new and desire to secure by Letters Patent—

1. The clutch-operating mechanism herein shown and described, consisting of a clutch having capacity of longitudinal movement on the shaft, rotating with the shaft, and provided with a radial projection, a clutch-block provided with two cam-blocks having oppositely-inclined beveled faces, and mechanism for operating the cam-blocks to encounter the radial projection on the clutch and move the clutch in one or the opposite direction on the shaft, as described.

2. The combination, with a clutch turning with the shaft and having capacity for longitudinal movement on the shaft and provided with a radial projection, and two cam-blocks having oppositely-inclined beveled surfaces, of a slide provided with slots or ways connected with the cam-blocks, and a hinged lever connected with the slide, the end of which is in the path of the radial projection on the clutch, the whole adapted to slide the clutch in one direction to transmit power and automatically slide the clutch in the opposite direction, as described.

3. In a clutch-operating device, the combination, with the shaft 18, the loose clutch-gear 21, and the clutch 22, provided with the pin 23, of the clutch-block 24, the cam-blocks 26 and 27, provided with oppositely-inclined beveled faces, the slide 28, provided with the cam-slots $26^a$ and $27^a$, the hinged arm 29, connected with the slide 28, and mechanism for operating the slide, as described.

4. In a cloth-pressing machine, in combination with the cylinder and the presser block or blocks, the shaft 16 and mechanism intermediate the said shaft and the presser block or blocks, the gear 17, secured to the shaft 16, the driving-shaft 18, the loose clutch-gear 21, the clutch 22, provided with the projecting pin 23, the cams 26 and 27, having oppositely-inclined beveled faces, and mechanism for operating the cams, as described.

5. The combination, with the cylinder and the presser-blocks of a cloth-pressing machine, the arms or levers for operating a presser block or blocks, the mechanism for operating the arms or levers, and the driving-shaft from which motion is imparted to the machine, of a clutch rotating with the driving-shaft, having capacity of longitudinal motion on the shaft and provided with a projecting pin, two cam-blocks having oppositely-inclined beveled faces, and the mechanism, substantially as described, by which the driving-shaft is connected with the mechanism for operating the presser-blocks and automatically disconnected therefrom, as described.

GEORGE W. VOELKER.

Witnesses:
M. F. BLIGH,
J. A. MILLER, Jr.